April 3, 1928.
F. GOUVION
1,665,093
LIQUID DISTRIBUTING APPARATUS
Filed Jan. 24, 1923   2 Sheets-Sheet 1
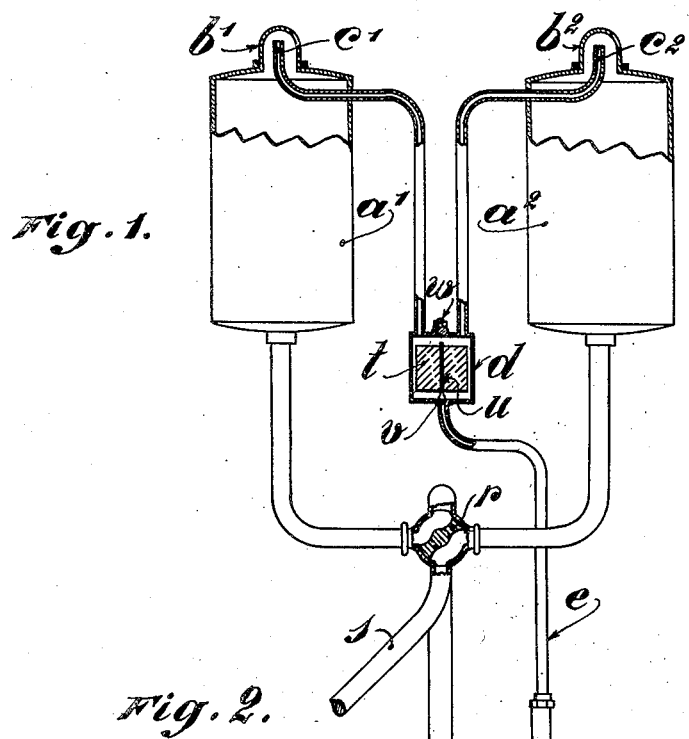
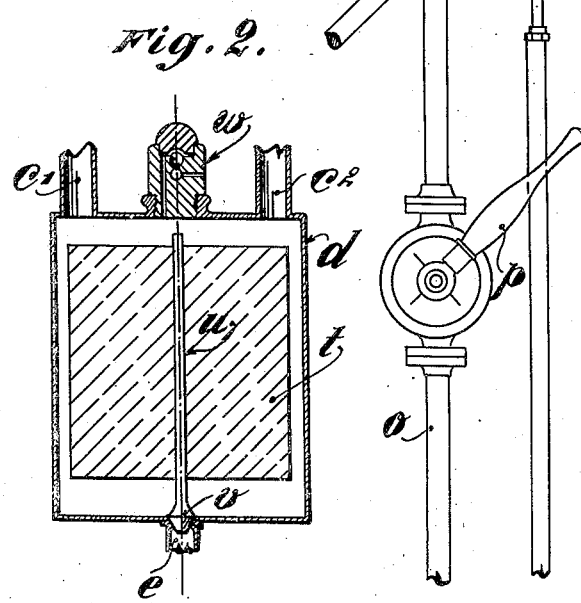
Inventor
Franz Gouvion,
By B. Singer, Atty

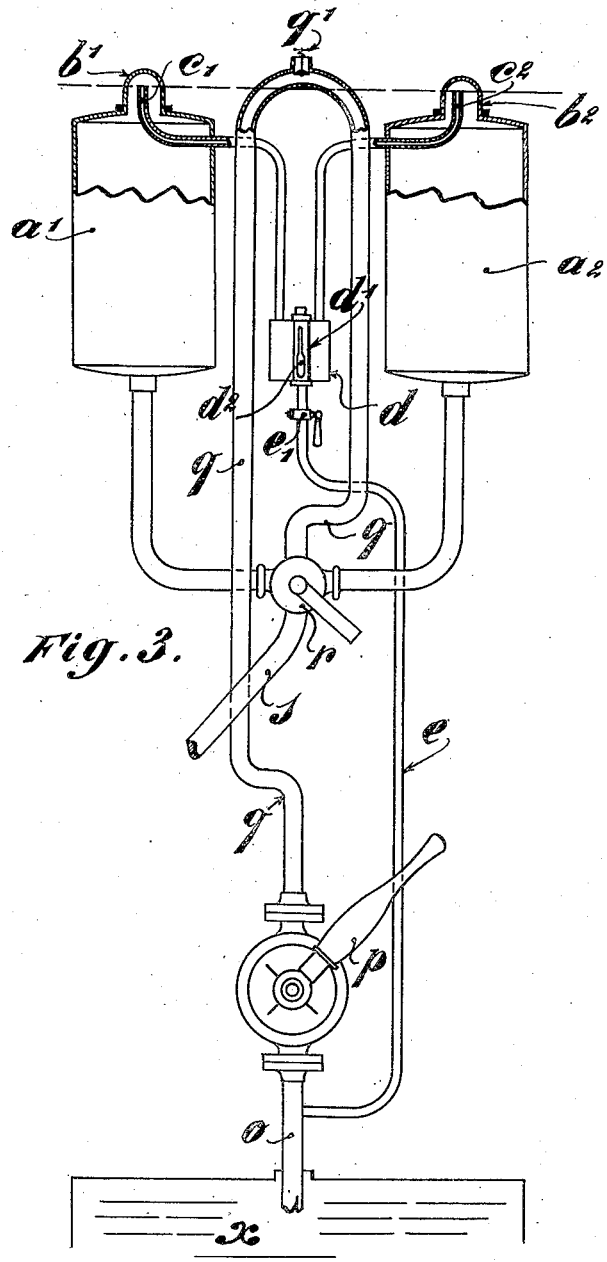

Patented Apr. 3, 1928.

1,665,093

UNITED STATES PATENT OFFICE.

FRANZ GOUVION, OF BRUSSELS, BELGIUM.

LIQUID-DISTRIBUTING APPARATUS.

Application filed January 24, 1923, Serial No. 614,706, and in Belgium January 24, 1922.

The present invention relates to liquid distributors of the type in which the distribution is effected by means of two measuring vessels with overflow tubes, vessels which are fed alternately by the discharge from a pump, one vessel emptying while the other fills under the control of a four way valve or equivalent means.

In order to insure a more rapid flow of the liquid measured in the vessels, the invention consists essentially in using the pressure of the air forced out of one of the measuring vessels, while it is being filled, into the other measuring vessel, while it is being emptied, the communication between the two vessels being established through the two overflow tubes and the overflow reservoir into which the tubes empty.

The invention also consists in supplying a means for showing when each measuring vessel is full, by mounting a glass sight gauge tube on the top of each vessel, the end of the corresponding overflow tube being inside the sight gauge tube.

The invention also consists in supplying means for showing the overflow from each measuring vessel and the density of the discharged liquid, by placing a glass window and a hydrometer in the overflow reservoir.

The invention also consists in providing means enabling the liquid in the measuring vessels to be positively maintained on a level with the ends of the overflow tubes without depending on the uncertain tightness of check valves.

Finally, the invention consists in utilizing the suction pipe of the pump feeding the measuring vessels, in order to return the overflow from the vessels to the tank.

As an example, a form of execution of apparatus embodying the invention is represented on the accompanying drawings, in which:

Figure 1 is a diagrammatic elevation and partial section of the apparatus.

Figure 2 is an enlarged vertical section of the reservoir receiving the overflow from the two measuring vessels.

Figure 3 is a diagrammatic elevation partly in section of the apparatus including an overflow tank provided with a visible hydrometer.

In the various figures, $a^1$ $a^2$ designate the two measuring vessels each topped by a glass overflow chamber $b^1$, $b^2$ with overflow tubes $c^1$, $c^2$ emptying into the common overflow reservoir $d$. A drain pipe $e$ leads the liquid from the reservoir $d$ to the suction pipe $o$ of the pump $p$, from which the liquid flows down into the tank $x$. The discharge pipe $q$ from the pump rises preferably slightly above the ends of the overflow tubes in the measuring vessels (Figure 3) and then runs down to a four way valve $r$ enabling the measuring vessels to be fed from the bottom and also controlling the discharge pipe $s$ which carries away the liquid measured.

Figure 1 shows the arrangement of the valve $r$.

The reservoir $d$, which receives the discharge from the overflow tubes $c^1$ $c^2$ contains preferably a float $t$ equipped with a rod $u$ with lower valve $v$ for stopping the end of the drain pipe $e$ when the float drops, while an upper valve $w$ lets the air automatically into the reservoir.

The said reservoir $d$ is preferably fitted with a gauge tube $d'$ holding a hydrometer $d^2$, but this reservoir may also be made of glass. The drain pipe $e$ from the reservoir is provided with a valve $e'$.

In order to observe the density of the discharged liquid it is only necessary to momentarily close the valve $e'$ so as to let the reservoir $d$ fill sufficiently to read the depth of the hydrometer.

The operation of the apparatus arranged as described above is as follows:

The measuring vessel $a^1$ is first filled by means of the pump $p$, the valve $r$ being in the position indicated in Figure 1. The air contained in the vessel $a^1$ is forced out by the liquid and passes through the pipe $c^1$ into the reservoir $d$, and then passes through the pipe $c^2$ into the measuring vessel $a^2$. When the vessel $a^1$ is full, the condition may be noted by observing the level of the liquid in the overflow chamber $b^1$, the excess liquid being drawn off by the tube $c^1$ and led into the reservoir $d$. If the pumping is continued into the vessel $a^1$, the excess liquid thus drawn off into the reservoir $d$ will lift the float $t$ and open the valve $v$ so as to return the liquid to the suction pipe $o$ and thence to the supply tank $x$ (Fig. 3).

In order to empty the measuring vessel $a^1$, the valve $r$ is turned a quarter turn and the liquid from the said vessel runs off through the discharge pipe $s$.

If pumping is continued while the measuring vessel $a^1$ is emptying, the measuring vessel $a^2$ will be filled, and the air which is forced out of the vessel $a^2$ will be led under pressure into the vessel $a^1$, causing the liquid in the latter to flow out more rapidly.

In case it is simply desired to empty the vessel $a^1$ without filling the vessel $a^2$, the air enters into the former by passing through the valve $w$.

When the discharge pipe $q$ from the pump $p$ is placed so as to rise up to the upper level of the measuring vessels as shown in Figure 3, a suitable automatic air inlet valve $q^1$ is installed at the highest point in the pipe so that the column of liquid in the siphon formed by the pipe will be broken by the entering air.

During the filling of the receptacle $a^1$ the air escapes through the tube $c^1$, passes into the overflow reservoir $d$ and goes from there into the receptacle $a^2$ where pressing on the liquid, it accelerates the emptying of the receptacle.

I declare that what I claim is:

Liquid measuring and distributing apparatus comprising a pair of measuring receptacles, means to supply them alternately with liquid, an overflow duct leading from each of said receptacles, an excess liquid receiving receptacle into which said ducts, discharge, said ducts also communicating with each other by reason of their connection with the excess liquid receiving receptacle so that air is caused to pass between said measuring receptacles while they are alternately filled and emptied, and a duct for the discharge of liquid from said excess liquid receiving receptacle, said excess liquid receiving receptacle having an automatically acting air inlet valve and also having a float operated valve to control the discharge of liquid therefrom.

In testimony whereof I affix my signature.

FRANZ GOUVION.